No. 620,261. Patented Feb. 28, 1899.

J. T. THORPE.
PANTS HOLDER.

(Application filed Apr. 30, 1898.)

(No Model.)

WITNESSES
E. J. Nottingham
G. F. Downing

INVENTOR
J. T. Thorpe
By H. A. Seymour
Attorney

THE NORRIS PETERS CO., PHOTO-LITHO., WASHINGTON, D. C.

UNITED STATES PATENT OFFICE.

JOHN T. THORPE, OF BALTIMORE, MARYLAND.

PANTS-HOLDER.

SPECIFICATION forming part of Letters Patent No. 620,261, dated February 28, 1899.

Application filed April 30, 1898. Serial No. 679,395. (No model.)

*To all whom it may concern:*

Be it known that I, JOHN T. THORPE, a resident of Baltimore, in the State of Maryland, have invented certain new and useful Improvements in Pants-Holders; and I do hereby declare the following to be a full, clear, and exact description of the invention, such as will enable others skilled in the art to which it appertains to make and use the same.

My invention relates to an improvement in pants-holders, the objects of the invention being to produce a pants-holder which shall be simple in construction, into which the pants can be readily inserted and from which they can be equally as readily withdrawn, which shall comprise few parts, which shall be cheap to manufacture, which shall occupy small space, and which shall be effectual in all respects in the performance of its functions.

With these objects in view the invention consists in certain novel features of construction and combinations and arrangements of parts, as hereinafter set forth, and pointed out in the claims.

Figure 1:
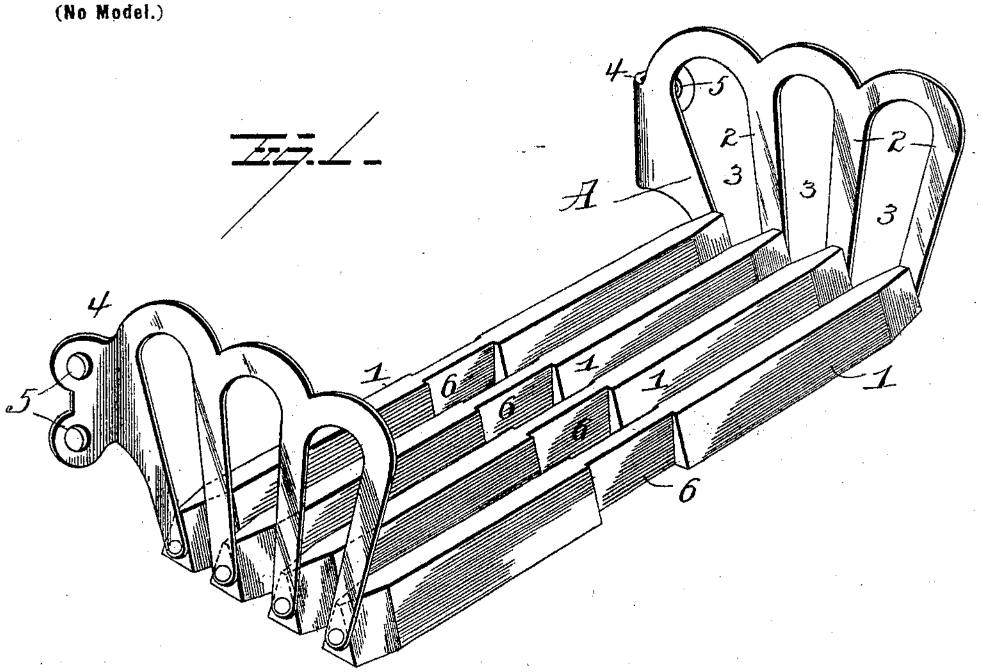
Figure 2:
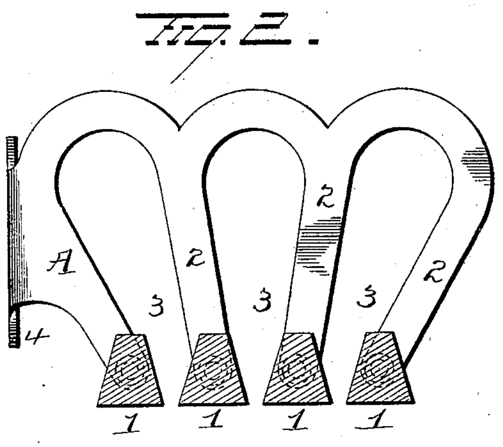

In the accompanying drawings, Figure 1 is a perspective view of my improved pants-holder. Fig. 2 is a sectional view, and Fig. 3 is a view of a slight modification.

In constructing my improved pants-holder I employ a series of any desired number of parallel bars 1, (four being shown in the drawings,) which are spaced apart to form spaces for the reception of the ends of the pants. The bars may be made wedge-shaped in cross-section and the spaces between them are open at both ends, the ends of the bars being made beveled (or conical) to form mouths for the spaces between said bars. The bars are held in position, properly spaced apart by means of two brackets A. Each bracket consists of a series of arms 2 2 2 2, connected together at their upper ends and secured at their lower ends to the ends of the bars 1, the spaces 3 between said arms forming loops or openings to permit the insertion of the pants between the bars 1.

Figure 3:
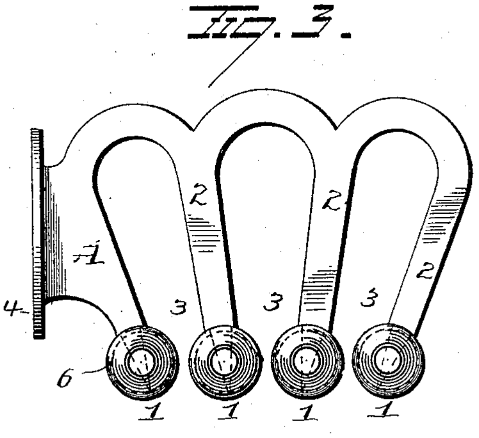

Instead of securing the ends of the arms 2 of the brackets to the ends of the bars 1 the lower ends of said arms 2 may be pointed and made to enter the bars 1 inwardly from the ends thereof, and instead of making the bars 1 wedge-shaped, as shown in Figs. 1 and 2, they may be made round, as shown in Fig. 3.

Each bracket A is provided with an ear or flange 4, having holes 5 therein for the passage of fastening devices, whereby to secure the holder to a cupboard-door or other convenient place.

Each bar 1 is preferably recessed, as at 6, centrally between its ends, and the enlargement of the space between the bars thus formed serves to receive the overlying seams of the pants-legs, so that the bars will exert an equal pressure against the pants-legs the full width thereof and not exert more pressure against the seams than elsewhere.

My improvements are very simple in construction, are cheap to manufacture, and are effectual in the performance of their functions.

Slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. A pants-holder comprising two vertically-disposed brackets, each consisting of a series of depending arms connected together at their upper ends with the spaces between said arms open at the lower end of the bracket whereby to permit the insertion of pants through the spaces between said arms, and a horizontal series of bars secured at their ends to the free lower ends of the arms of the respective brackets whereby to clamp pants and suspend them in a perpendicular position.

2. A pants-holder comprising two vertically-disposed brackets, each having a series of spaces open at their lower ends, and a horizontal series of bars wedge-shaped in cross-section and secured at their respective ends to the brackets between the open ends of the spaces therein, substantially as set forth.

3. A pants-holder comprising two vertically-disposed brackets, each consisting of a series of depending arms connected together at their upper ends and free at their lower ends whereby to permit the insertion of pants through the open spaces between said depending arms, a horizontal series of bars secured at their respective ends to the free lower ends of the arms of the respective brackets whereby to clamp the pants and suspend them in a perpendicular position and perforated lugs projecting at right angles from one edge of each bracket whereby to so support the device against a flat door or wall that the bars will be disposed in a horizontal position, substantially as set forth.

In testimony whereof I have signed this specification in the presence of two subscribing witnesses.

JOHN T. THORPE.

Witnesses:
R. S. FERGUSON,
S. G. NOTTINGHAM.